Nov. 13, 1945. W. C. McCANN 2,388,861
SMALL GRAIN WINDROWER
Filed April 11, 1944 4 Sheets-Sheet 1
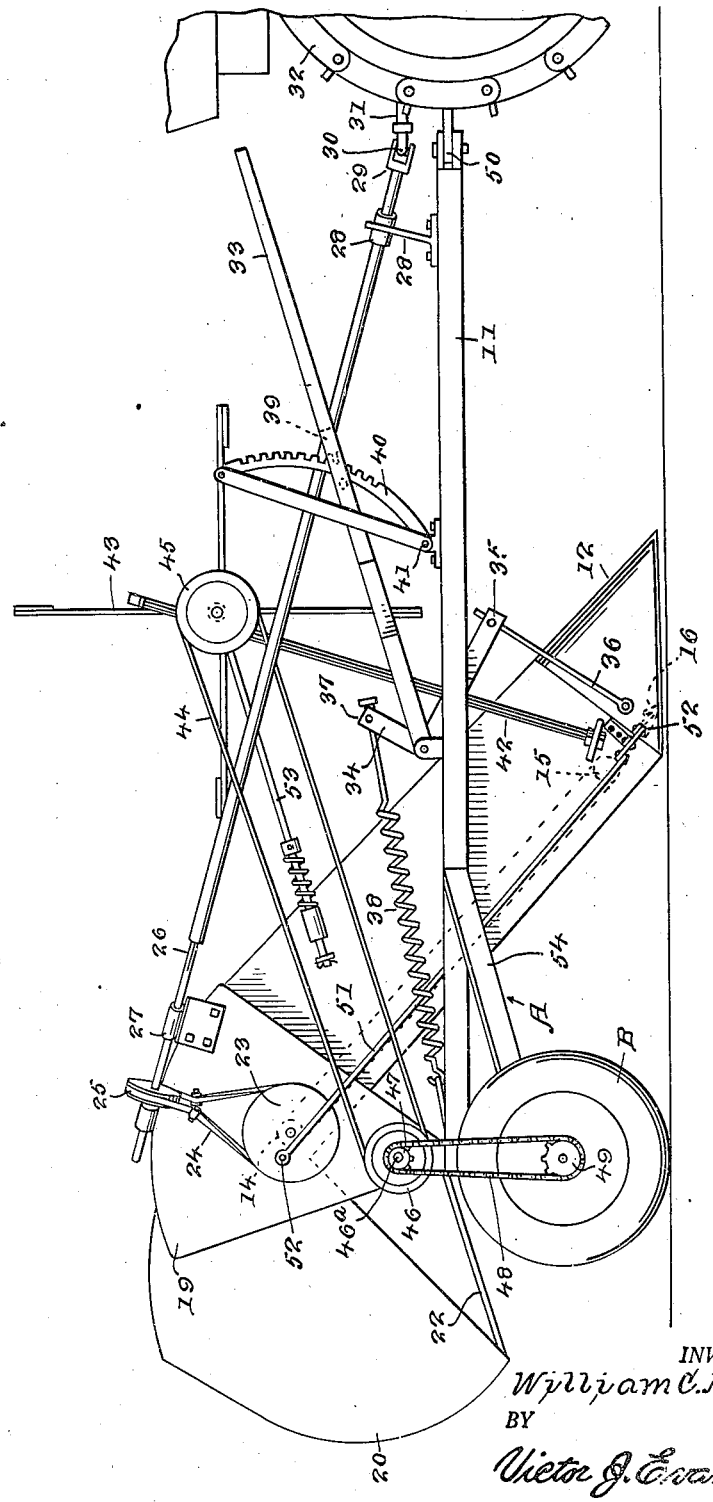
INVENTOR.
William C. McCann
BY
Victor J. Evans & Co.
ATTORNEYS

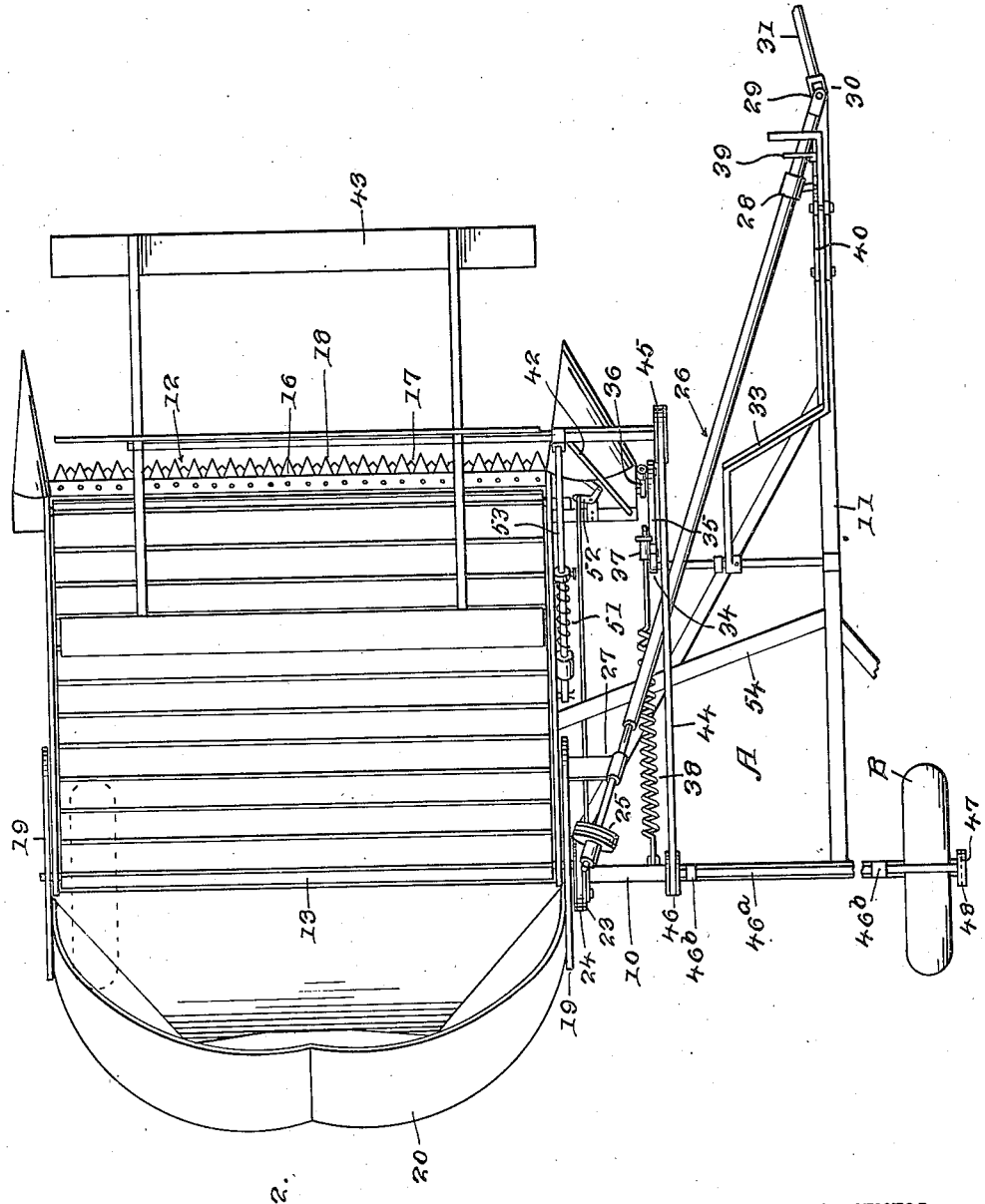

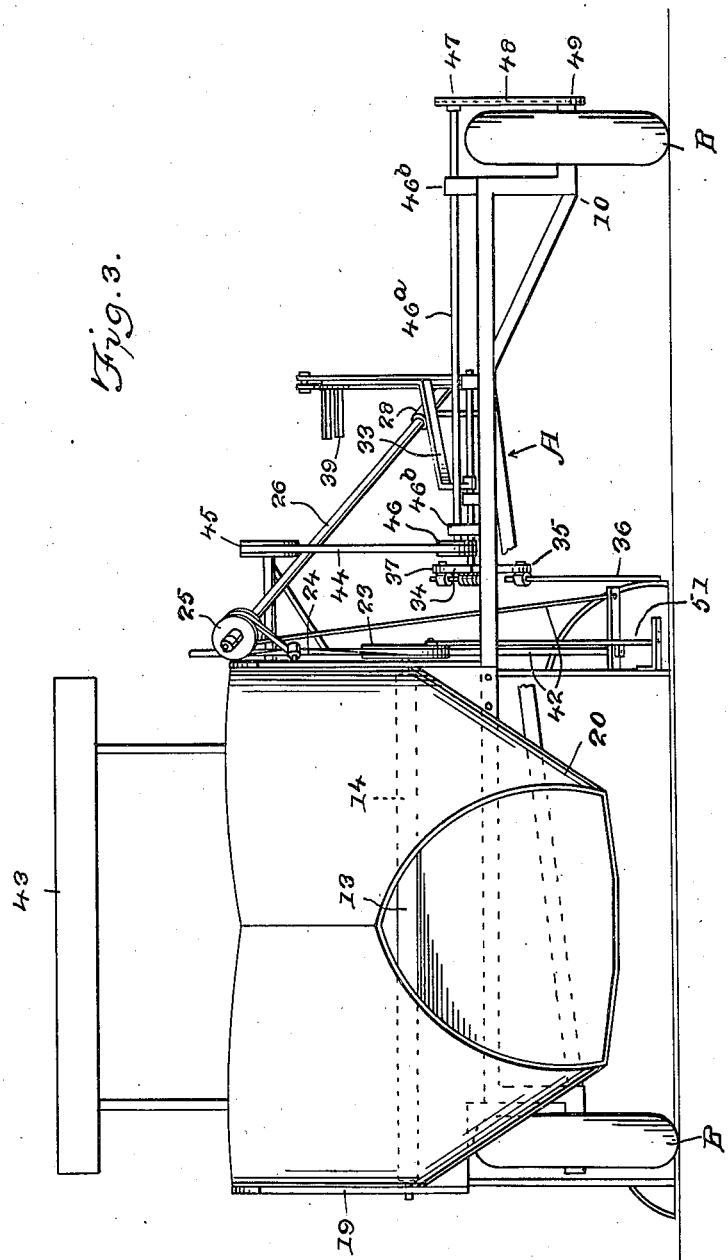

Nov. 13, 1945. W. C. McCANN 2,388,861
SMALL GRAIN WINDROWER
Filed April 11, 1944 4 Sheets-Sheet 4
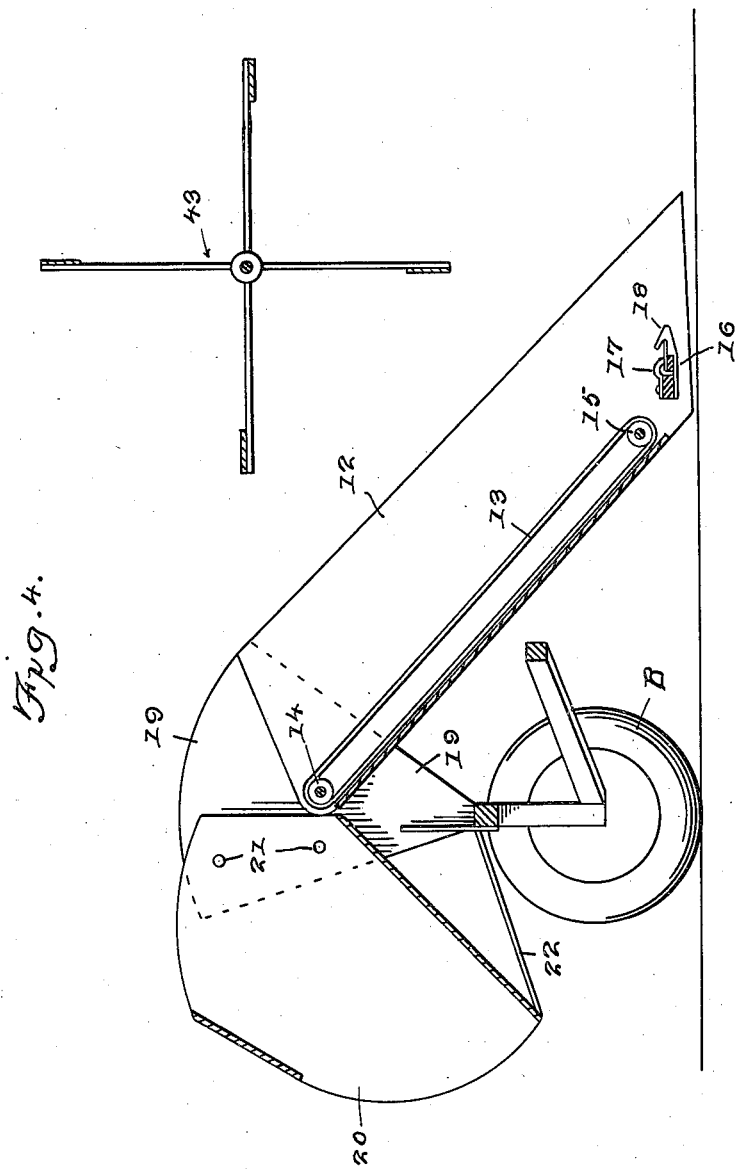
INVENTOR.
William C. McCann
BY
Victor J. Evans & Co.
ATTORNEYS Patented Nov. 13, 1945

2,388,861

UNITED STATES PATENT OFFICE 2,388,861

SMALL GRAIN WINDROWER

William C. McCann, Windom, Minn.

Application April 11, 1944, Serial No. 530,502

6 Claims. (Cl. 56—185)

The invention relates to a windrow, and more particularly to small grain windrowers.

The primary object of the invention is the provision of a machine of this character, wherein small grain is windrowed so that it is picked up and threshed by a small rub-bar wide cylinder combine, and such machine is unique in that it delivers a wide swatch and lays it upon the ground on an undisturbed stubble, the wide swath being necessary if one is to utilize the effective threshing ability of a wide rub-bar cylinder, the type most small combines use.

Another object of the invention is the provision of a machine of this character, wherein the wide swath layed down is delivered straight back of the cutter bar, and the cut grain travels up an incline and down a chute without making any corner turns.

Another object of the invention is the provision of a machine of this character, wherein no straw choking action can take place during the cutting and conveying operations of the machine, as the grain is not caused to change its direction of travel in the operation of the said machine.

A further object of the invention is the provision of a machine of this character, which is simple in construction, thoroughly reliable and efficient in operation, strong, durable, novel in its entirety, and inexpensive to manufacture and install.

With these and other objects the invention consists in the features of construction, combination and arrangement of parts as will be hereinafter more fully described, illustrated in the accompanying drawings, which disclose the preferred embodiment of the invention, and pointed out in the claims annexed hereto.

In the accompanying drawings:

Figure 1 is a side elevation of the machine constructed in accordance with the invention.

Figure 2 is a top plan view thereof.

Figure 3 is a rear elevation.

Figure 4 is a fragmentary vertical longitudinal sectional view thereof.

Similar reference characters indicate corresponding parts throughout the several views in the drawings.

Referring to the drawings in detail A designates generally the wheeled main frame of the machine constructed in accordance with the invention, and B the ground wheels which are journaled on a wide sweep axle 10 located at the rear of a draft tongue 11, this having its position adjacent to one of the ground wheels to one side of the machine. Next to the other ground wheel of the machine is a forwardly inclined header 12 having the endless draper or apron 13 supported upon upper and lower rollers 14 and 15, respectively.

This header 12 at the lower forward end has arranged therewith a reciprocating sickle bar or cutter 16 working in a guide 17 with the fingers 18, which is of standard construction. The header 12 at the upper end thereof is located between sector shaped side plates 19, which rise from the axle 10 vertically therefrom and are braced and secured in any suitable manner.

Meeting the upper open end of the header 12 is a rearwardly inclined outwardly tapered chute 20, which at opposite side areas thereof is fastened at 21 to the plates 19. The chute 20 has joined therewith braces 22 for holding it inclined.

To the upper roller 14, that is to say, its axle at the end next to the tongue 11 is a belt pulley 23 having trained thereover a twisted belt 24, which is also trained over a companion pulley 25 fixed to an extensible driven shaft 26 supported in bearings 27 and 28, respectively, and equipped with a universal joint 29 coupled at 30 to a power shaft 31 of a driving take-off of a crawling tractor, or a wheel tractor with wide tread front and rear, only a portion thereof being denoted at 32 in Figure 1 of the drawings. This tractor is of any standard construction and is the draft medium for the machine.

The header 12 is vertically swingable and has the axle for the upper roller 14 for its axis. The tongue 11 has pivoted thereto a raising and lowering lever 33 operating a bell-crank 34, which at the arm 35 is lined at 36 to the header 12, while the arm 37 of such crank is tensioned by a spring 38 attached to the axle 10. The lever 33 carries a hand released latch 39 engaging a keeper 40, which is swingably supported at 41 to conform to the arcuate movement of the header 12 on adjustment thereof and the cutter unitary therewith.

Fixed to and rising from opposite sides of the header 12 are uprights 42 having journaled thereon above the lower mouth portion of the said header a reel 43, which is driven from a belt 44 trained over a pulley 45 on the axle of the reel and also trained over a pulley 46 mounted on a shaft 46ª journaled in bearing 46ᵇ. This shaft is also fitted with a sprocket wheel 47 having trained over the same a sprocket chain 48 which is also trained over a sprocket wheel 49, on one of the said ground wheels B. In this manner the reel is rotated by power from this ground wheel B.

The ground wheels B support the frame A at the rear thereof, while the tongue 11 which has a hitch at 50 with the tractor, supports the front end of the frame A.

The pulley 23 has concentrically connected thereto an operating rod 51 which through the connections 52 actuates the cutter 16 for its working.

Co-acting with the reel 43 is a belt tightener 53 for the belt 44 driving such reel.

The frame A with the tongue 11 is suitably braced as at 54 to give a rigidity thereto.

In the operation of the machine when drawn by a tractor the grain is cut by the cutter 16 and swept onto the header at the lower mouth end thereof, then the header delivers the cut grain into the chute 20 without the material making any corner turns and the latter discharges a wide swath and lays it on an undisturbed stubble upon the ground. The discharge end of the chute 20 may be of any desired width, there being a straight-through principle used in the machine for the handling of the cut grain so that there can be no choking action in the working of the said machine.

What is claimed is:

1. A machine of the kind described, comprising a wide sweep axle, ground wheels journalled on said axle, a draft tongue connected to said axle, sector shaped side plates mounted on said axle a forwardly inclined header having a cutter at its lower end and the upper end thereof interposed between said sector shaped side plates, and a rearwardly inclined outwardly tapered chute fastened at opposite side areas thereof to said plates and thereby meeting the header at its upper end.

2. A machine of the kind described, comprising a wide sweep axle, ground wheels journalled on said axle, a draft tongue connected to said axle, sector shaped side plates mounted on said axle a forwardly inclined header having a cutter at its lower end and the upper end thereof interposed between said sector shaped side plates, a rearwardly inclined outwardly tapered chute fastened at opposite side areas thereof to said plates and thereby meeting the header at its upper end, and a wheeled support for the header and chute.

3. A machine of the kind described, comprising a wide sweep axle, ground wheels journalled on said axle, a draft tongue connected to said axle, sector shaped side plates mounted on said axle a forwardly inclined header having a cutter at its lower end and the upper end thereof interposed between said sector shaped side plates, a rearwardly inclined outwardly tapered chute fastened at opposite side areas thereof to said plates and thereby meeting the header at its upper end, a wheeled support for the header and chute, and a rotary reel above the lower end of the header.

4. A machine of the kind described, comprising a wide sweep axle, ground wheels journalled on said axle, a draft tongue connected to said axle, sector shaped side plates mounted on said axle a forwardly inclined header having a cutter at its lower end and the upper end thereof interposed between said sector shaped side plates, a rearwardly inclined outwardly tapered chute fastened at opposite side areas thereof to said plates and thereby meeting the header at its upper end, a wheeled support for the header and chute, a rotary reel above the lower end of the header, and means for raising and lowering the header.

5. A machine of the kind described, comprising a wide sweep axle, ground wheels journalled on said axle, a draft tongue connected to said axle, sector shaped side plates mounted on said axle a forwardly inclined header having a cutter at its lower end and the upper end thereof interposed between said sector shaped side plates, a rearwardly inclined outwardly tapered chute fastened at opposite side areas thereof to said plates and thereby meeting the header at its upper end, a wheeled support for the header and chute, a rotary reel above the lower end of the header, means for raising and lowering the header, and means for driving the cutter, header and reel simultaneously with each other.

6. A machine of the kind described, comprising a wide sweep axle, ground wheels journalled on said axle, a draft tongue connected to said axle, sector shaped side plates mounted on said axle a forwardly inclined header having a cutter at its lower end and the upper end thereof interposed between said sector shaped side plates, a rearwardly inclined outwardly tapered chute fastened at opposite side areas thereof to said plates and thereby meeting the header at its upper end, a wheeled support for the header and chute, a rotary reel above the lower end of the header, means for raising and lowering the header, means for driving the cutter, header and reel simultaneously with each other, and an endless conveyor working within the leader.

WILLIAM C. McCANN.